United States Patent
Kao et al.

(10) Patent No.: US 6,462,757 B1
(45) Date of Patent: Oct. 8, 2002

(54) METHOD, SYSTEM AND COMPUTER PROGRAM PRODUCT FOR LOCATING A WINDOW OF A WINDOWS OPERATING SYSTEM IN A COMPUTER SYSTEM

(75) Inventors: I-lung Kao, Round Rock; Shaw-Ben Shepherd Shi; Yi-Hsiu Wei, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,627

(22) Filed: Jun. 30, 1999

(51) Int. Cl.$^7$ ................................................. G06F 3/00
(52) U.S. Cl. ..................... 345/783; 345/788; 345/792; 345/793; 345/968
(58) Field of Search .......................... 345/764, 781, 345/783, 788, 789, 790, 792, 793, 794, 795, 796, 797, 968; 707/4, 14

(56) References Cited

U.S. PATENT DOCUMENTS

| | | | | |
|---|---|---|---|---|
| 5,483,633 A | * | 1/1996 | Johnson | 345/764 |
| 5,499,334 A | | 3/1996 | Staab | 395/157 |
| 5,534,887 A | | 7/1996 | Bates et al. | 345/120 |
| 5,579,469 A | | 11/1996 | Pike | 395/326 |
| 5,621,880 A | | 4/1997 | Johnson | 395/326 |
| 5,878,410 A | * | 3/1999 | Zbikowski et al. | 707/2 |
| 5,892,511 A | * | 4/1999 | Gelsinger et al. | 345/794 |
| 6,025,842 A | * | 2/2000 | Filetto et al. | 345/803 |
| 6,040,833 A | * | 3/2000 | Henshaw | 345/794 |

* cited by examiner

*Primary Examiner*—John Cabeca
*Assistant Examiner*—Kieu D. Vu
(74) *Attorney, Agent, or Firm*—Jeffrey S. LaBaw; Bracewell & Patterson, L.L.P.

(57) ABSTRACT

A window locator is provided for finding a particular window among a plurality of windows running different applications or different instances of a single application. A linked list is maintained with parameters for each window open, whether active or minimized, and updated whenever a window is opened or closed, or when a new command. is started within a window. For each active or minimized window, the linked list contains: the command or application name being run or last typed within each window; the parameters, such as a filename or uniform resource locator, for the command or application; the current working directory for the command or application; and the times tamp-for the start of the command or application. In response to a user request specifying the command or application, name, parameters, or times tamp of the desired window, the window locator traverses the linked list and filters the entries for candidate windows utilizing the user-specified search criteria. Candidate windows are sorted and displayed in a manner which may be specified by the user.

18 Claims, 5 Drawing Sheets wingrep -C "vi" -P "foo*.txt" -D "d:\foodir"   ⟵ 302

*Fig. 3A*

WINGREP — 304

Search by:

◉ Command/Application Name
[ vi ]

◉ Command Parameters
[ foo*.txt ]

◉ Current Directory
[ d:\foodir ]

Show results as:

◉ Cascaded
○ Tiled
○ Cascaded with time delay
○ Round robin with time delay

Sort results by:

◉ Name
○ Parameters
○ Combined
○ Working directory
○ Timestamp

*Fig. 3B*

METHOD, SYSTEM AND COMPUTER PROGRAM PRODUCT FOR LOCATING A WINDOW OF A WINDOWS OPERATING SYSTEM IN A COMPUTER SYSTEM

BACKGROUND OF THE INVENTION

1. Technical Field

The present invention generally relates to windows management in graphical user interface operating systems and in particular to locating specific windows from among multiple windows. Still more particularly, the present invention relates to locating windows among multiple windows which satisfy user-specified criteria, then sorting and displaying candidate matches.

2. Description of the Related Art

Several known operating systems employ "windows," the most common metaphor for tasks in graphical user interfaces, for running various applications while supporting multi-tasking, including the various versions of the Microsoft Windows operating system (Windows NT, Windows 95, Windows 98, etc.) and Unix X Windows. In such systems, each application—and each discrete instance of a single application—is run within a separate window, and the user may change between windows to switch tasks.

All such systems typically allow a user to "minimize" windows for tasks which the user is not currently actively controlling (i.e. tasks running in the "background"), usually as a small icon on the system desktop or in a task bar. By clicking on the minimized icon, or by cycling through a displayed sequence of icons utilizing a hot key (e.g., "Alt-Tab") until the desired icon i s highlighted, the associated application becomes application which is displayed, within an "active", window, and to which user interface actions (e.g., keyboard or mouse activity) is directed.

Icons for different applications are often similar, particularly within a group or "suite" of related applications. Even where the icons differ markedly for each application, the same icon is typically employed for each instance of a single application which is running (e.g., a browser), and text descriptions associated with the icons on the system desktop or in the task bar are generally abbreviated, providing little help in distinguishing instance s of an application.

Accordingly, if several applications are concurrently running within a multitasking, graphical user interface operating system—particularly if several instances of a single application are running—and are minimized, it becomes fairly difficult to find a specific window from the minimized icons without searching through each active application or instance by making the associated window the currently active window. Such effort consumes both time and system resources.

It would be desirable, therefore, to enable a user locate particular windows among a plurality of windows for applications running within a multitasking, graphical user interface operating system. It would further be advantageous for the window locator mechanism to support user-specified key word searches, and to sort and display candidate windows to the user in a user-specified manner.

SUMMARY OF THE INVENTION

It is therefore one object of the present invention to provide improved windows management in graphical user interface operating systems.

It is another object of the present invention to provide a utility for locating specific windows from among multiple windows in graphical user interface operating systems.

It is yet another object of the present invention to locate windows among multiple windows in graphical user interface operating systems which satisfy user-specified criteria, then sorting and displaying candidate matches.

The foregoing objects are achieved as is now described. A window locator is provided for finding a particular window among a plurality of windows running different applications or different instances of a single application. A linked list is maintained with parameters for each window open, whether active or minimized, and updated whenever a window is opened or closed, or when a new command is started within a window. For each active or minimized window, the linked list contains: the command or application name being run or last typed within each window; the parameters, such as a filename or uniform resource locator, for the command or application; the current working directory for the command or application; and the times tamp for the start of the command or application. In response to a user request specifying the command or application, name, parameters, or times tamp of the desired window, the window locator traverses the linked list and filters the entries for candidate windows utilizing the user-specified search criteria. Candidate windows are sorted and displayed in a manner which may be specified by the user.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3B are alternative user interface requests for a window locator. in accordance with a preferred embodiment of the present invention.

DESCRIPTION OF THE PREFERRED EMBODIMENT

Figure 1:
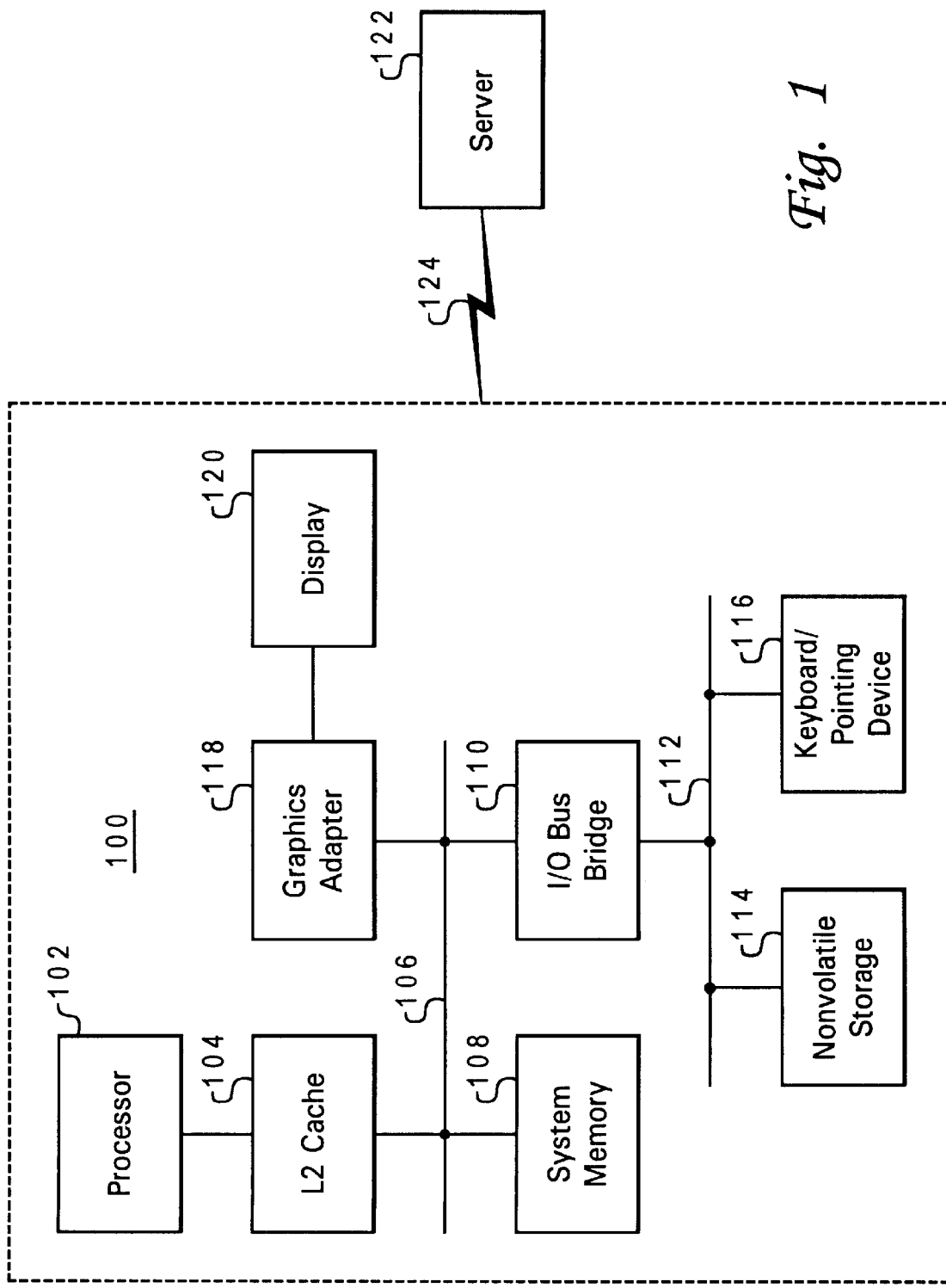
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 includes a processor 102, which is connected in the exemplary embodiment to a level two (L2) cache 104, connected in turn to a system bus 106.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, compact disk read-only memory (CD-ROM) drive, or digital video disk (DVD) drive, and keyboard/pointing device 116, which may include a conventional mouse, a trackball, or the like, are connected to I/O bus 112. Data processing system 100 further includes graphics adapter 116 connected to system bus 106, receiving primitives for rendering from processor 102 and generating pixels for display 120.

The operation of data processing system 100 is well known to those skilled in the art. A basic input/output system (BIOS), power-on self-test (POST), and various startup routines initialize the hardware and permit interaction between hardware components. An operating system, such as a version of the Windows operating system available from Microsoft Corporation of Redmond, Wash., provides a platform for execution of applications and for basic user interaction, such as display of information or manipulation of a cursor within the display by a pointing device. Operating system device drivers allow software components to interact with and control hardware components. Data processing system may be connected to a server 122 via a communications link 124 in accordance with known networking techniques.

In the present invention, either the operating system includes a window management utility of the type described below, or a window management application runs on top of the operating system. The window management utility permits the user to search through a plurality of open windows utilizing user-specified key word search criteria, with candidate is windows matching the specified search criteria being sorted and displayed in a manner specified by the user.

Figure 2:
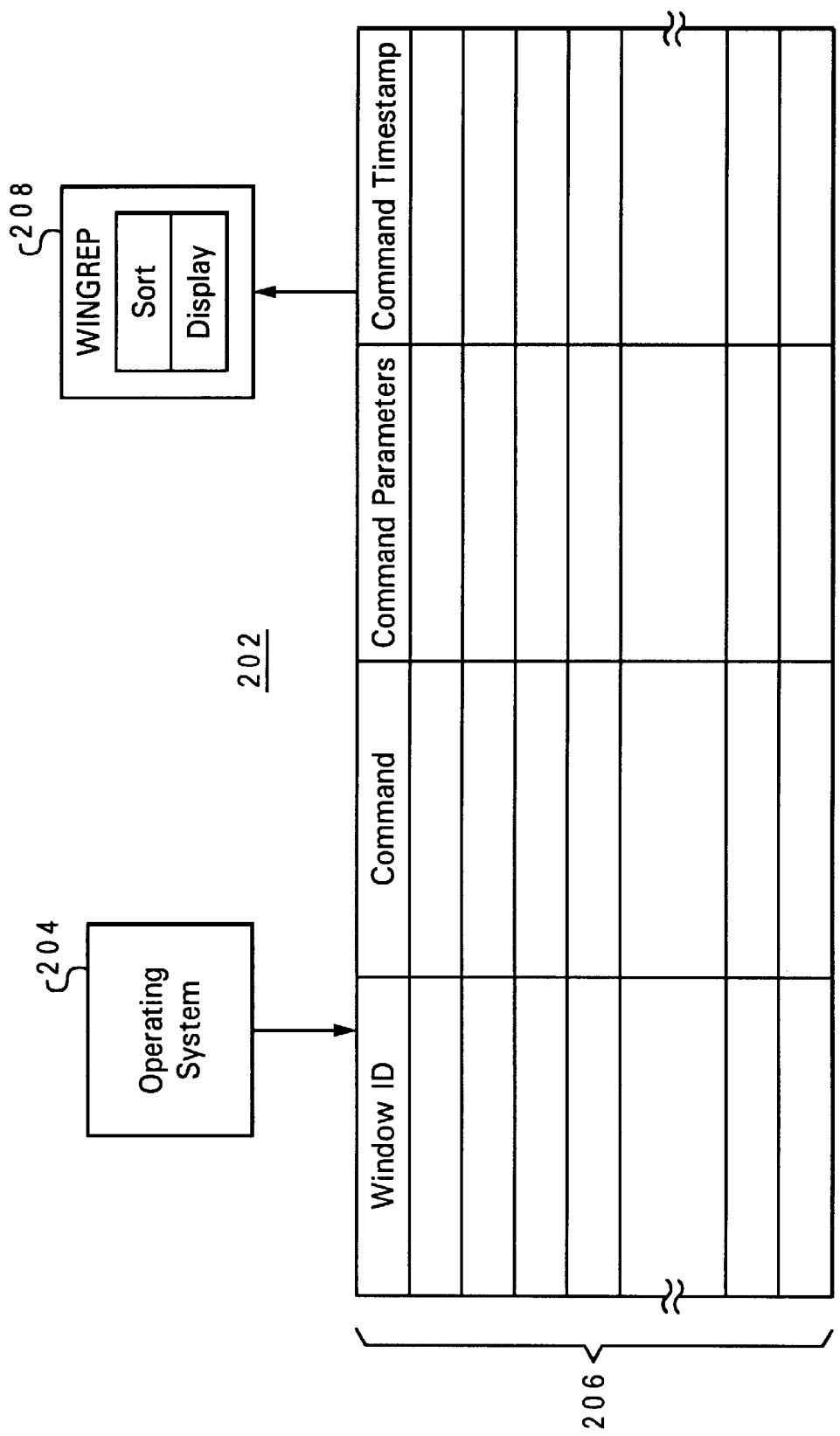
FIG. 2 is a diagram of a window management system in accordance with a preferred embodiment of the present invention.

Referring to FIG. 2, a diagram of a window management system in accordance. with a preferred embodiment of the present invention is illustrated. Window management system 202 includes, to some extent, the underlying operating system 204, and also includes linked list 206 and window locator 208. If window management system 202 is implemented at the operating system level, linked list 206 and window locator 208 may form part of operating system 204.

Linked list 206 is employed to keep track of all windows which are currently opened and, for command line interface windows such as a DOS window or an X-Window, the last command entered by the user and/or running within the window. Each window is represented by a node within linked list 206, and each node contains, in the exemplary embodiment, the unique window identifier of the window, the last command input by the user (the currently running command), the parameters of the user command, and the times tamp for the time at which the user input the command in the respective window.

Linked list 206 is created by operating system 204 at system startup and is maintained by operating system 204 during operation of the system. Each time a new window is opened for an application, whether a different application than any others currently running or merely a separate instance of an application already running in different window(s), a new node is added to the linked list 206 by operating system 204 with the parameters described above. it Each time a window is closed (not merely minimized or relegated to running in the background), operating system 204 deletes the corresponding node within linked list 206. This is easily accomplished since typically standardized controls and/or graphic devices are employed for opening and displaying windows as well as for closing windows and removing them from the display.

To the extent that a window may run different applications, particularly command line interface windows such as a DOS window or an X Windows window, operating system 204 tracks the command employed to start the application, the command parameters for the command, and the times tamp for the start of the command. These parameters of linked list 206 are updated by operating system 204 each time a new command is entered by the user, or the parameter otherwise changes.

Upon receiving a user request to locate a particular window, locator 208 traverses linked list 206, filtering out windows with the search criteria specified in the user request. Windows matching the search criteria specified by the user are displayed by locator 208 in the format specified by the user, who may then select the desired window.

With reference now to FIGS. 3A and 3B, alternative user interface requests for a window locator in accordance with a preferred embodiment of the present invention are depicted. FIG. 3A depicts command line interface command for requesting location of a particular window. The command parameters for the request which may be specified include: the name (–C) for the command or application currently running or last entered by the user in the desired window; the command parameters (–P), or the input parameter(s) (e.g., filename) for the command or application run within the window which the user wishes to locate; and the current directory (–D) of the running command or application within the window which the user wants located.

It should be noted that the locator request command parameters may be a regular expression, including the following metacharacters: "*" to indicate a wildcard character; to "[]" to specify any number of characters to be recognized; "$" represents the end of the string; "^" represents the beginning of the string; "." represents a single character. Additionally, the command parameters may be combined (e.g., –CP) and a single regular expression specified as the search criteria. specified current directory (–D) parameter string may be in the form of an operating system directory format, such as "d:\foodir". The specified command or application parameter (–P) may be in the form of either a filename, such as "foo*.txt", or a uniform resource locator (URL), such as "www.ibm.com". With this information, the same commands or applications running from different directories or different Web sites can be filtered out by the locator program.

In the example shown in FIG. 3A, the locator request is employed to locate a window in which the user is editing a file using the "vi" editor. The first three letters of the filename being edited are "foo" and the filename extension is ".txt". The working directory for the edit is "d:\foodir". The same request is depicted in FIG. 3B in a user dialog mockup for a graphical user interface.

Also depicted in FIG. 3B are radio buttons for a user to specify a desired sort order and/or display format for the search results. The user may specify the display format of candidate windows as: cascaded, where the candidate windows are displayed in cascaded form; tiled, where the candidate windows are displayed tiled on the screen; cascaded with time delay, where a .cascaded display of candidate windows cycles each candidate window to the front for a specified period, which the user may stop upon locating the desired window by a hotkey (e.g., space bar); and round robin with time delay, in which each candidate window is displayed one at a time in full screen for a specified period until the cycle is stopped by the user.

The user may specify the sort order of the candidate windows as alphabetical by command or application name, alphabetical by command or application parameters, alphabetical by combined command or application name and parameters, alphabetical by current working directory or location, or timestamp of execution.

Figure 4A:
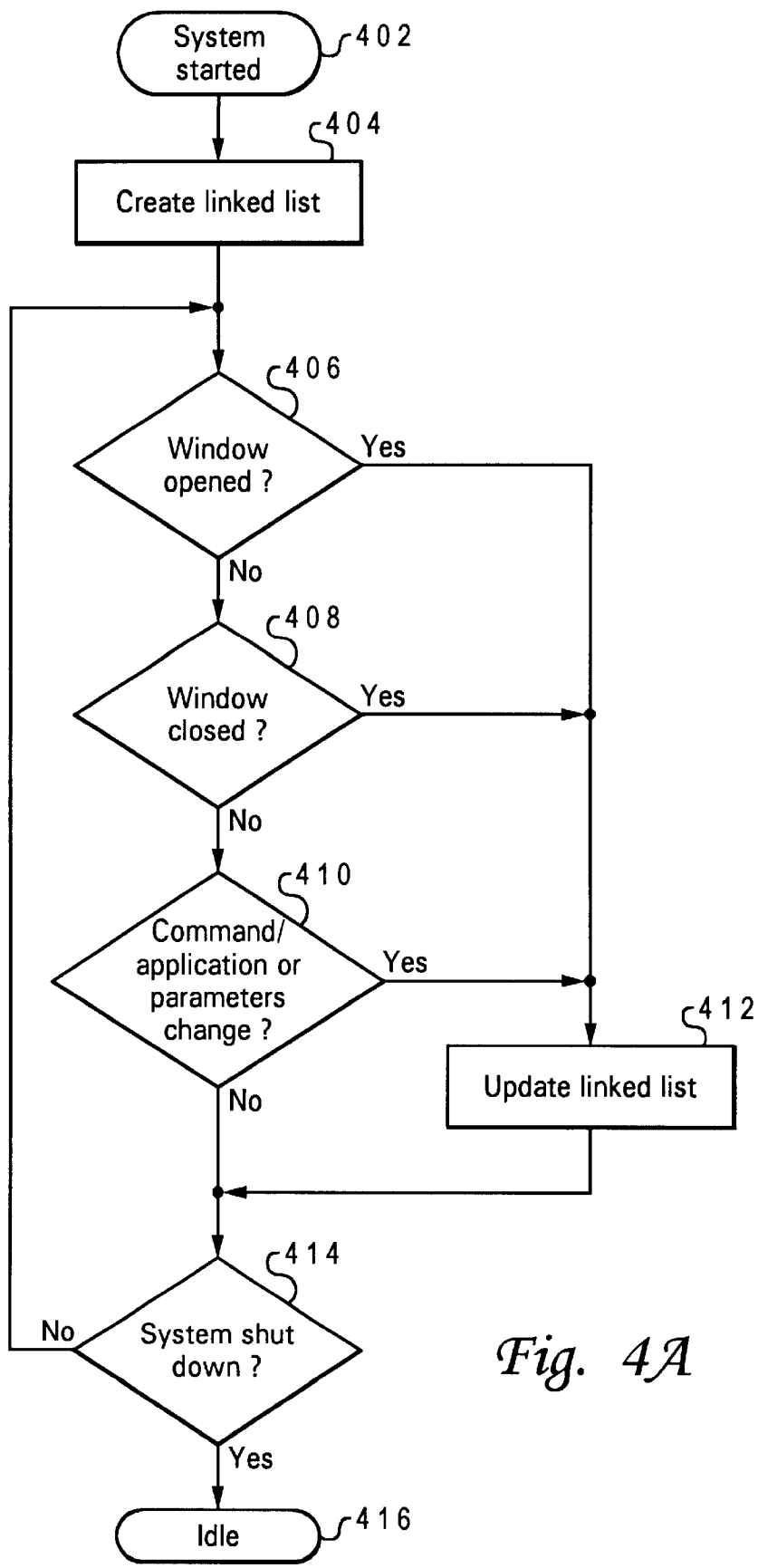
FIGS. 4A–4B are high level flowcharts for processes of establishing and employing a window locator within a window management system in accordance with a preferred embodiment of the present invention.
Figure 4B:
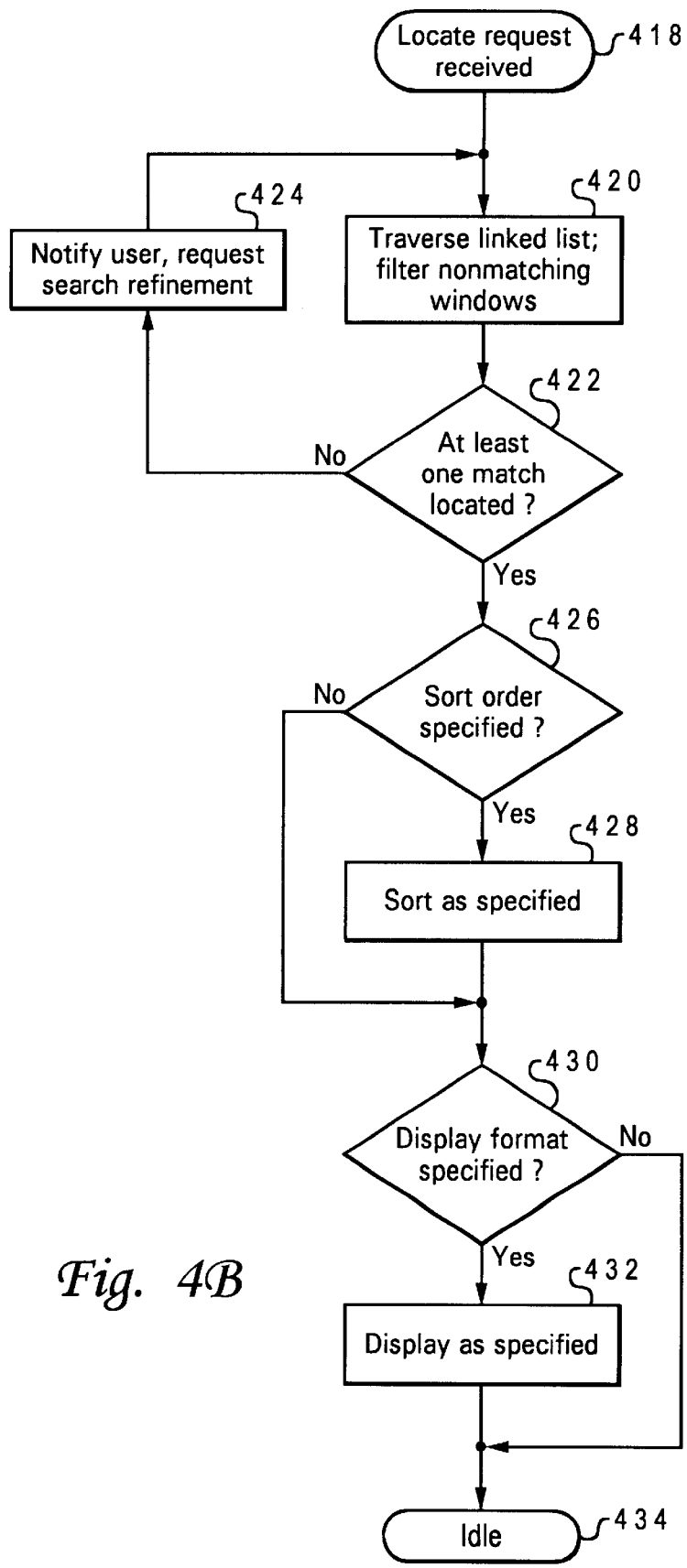

Referring to FIGS. 4A and 4B, high level flowcharts for processes of establishing and employing a window locator within a window management system in accordance with a preferred embodiment of the present invention are illustrated. FIG. 4A, which depicts a process for establishing a window locator, begins with step 402, which depicts the operating system being started. The process first passes to step 404, which illustrates creating the linked list for holding entries regarding open windows, whether active or minimized.

The process then passes to step 406, which illustrates a determination of whether a window has been opened. If not, the process proceeds to step 408, which depicts a determination of whether a window has been closed. If not the process proceeds to step 410, which illustrates a determination of whether the command or application, or any parameter of the command or. application, or the working directory for the command or application, has changed.

If any of the determinations made in steps 406, 408, or 416 are affirmative, the process process from the respective step to step 412, which depicts updating the linked list, either by creating an entry for an opened window, deleting an entry for a closed window, or modifying an entry for a window in which a new command or application, parameter, or working directory has been specified.

From step 410 if no change to a window is detected, or from step 412 if a change is detected, the process passes to step 414, which illustrates a determination of whether the system is being shut down. If not, the process returns to step 406 to continue polling for changes to the windows which are currently open. If so, however, the system may optionally store the linked list in nonvolatile to preserve the system state and restore it upon startup. The process passes to step 416, which depicts the process becoming idle until the system is restarted.

The process of employing a window locator, depicted in FIG. 4B, begins with step 418, which illustrates a locate request being received from the user. The process next passes to step 420, which depicts traversing the linked list and filter windows which do not match the user-specified search criteria, and then to step 422, which illustrates a determination of whether at least one match has been located. If not, the process proceeds to step 424, which depicts notifying the user that no match has been located and requesting refinement of the specified search criteria, then back to step 420 if revised search criteria are received.

If at least one match is received, the process proceeds instead to step 426, which illustrates a determination of whether a sort order was specified for the search results. If so, the process proceeds to step 428, which illustrates sorting the candidate windows matching the specified search criteria in the mannerspecified. Otherwise, or upon completion of the sort step 428, the process proceeds to step 430, which depicts a determination of whether a display format for the search results was specified. If so, the process proceeds to step 432, which illustrates displaying the candidate windows according to the specified format. Otherwise, or after completing displaying step 432, the process passes to step 434, which illustrates the process becoming idle until another locate request is received.

The present invention provides a tool to the user for finding windows through keyword searches on application or command names, application or command parameters, application or command working directories, or application or command start timestamps. After candidate windows are discovered by searching a list of open windows for those having attributes matching user-specified search criteria, the user may customize the display format and sort order. the tool may be implemented within any windows environment.

It is important to note that while the present invention has been described in the context of a fully functional data-processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of locating a window, comprising:

providing a list of each open window, wherein each entry within the list containing a plurality of searchable parameters relating to a respective window and an application running within the respective window;

responsive to receiving a locate request containing user specified search criteria, traversing the list and comparing each entry within the list to the search criteria to determine whether any entries within the list match the specified search criteria;

displaying all candidate windows corresponding to entries within the list which match the specified search criteria; and within each entry for the list, providing a name for a command or application running within a respective window, a filename or uniform resource locator parameter for the command or application running within the respective window, a working directory for the command or application running within the respective window, and a timestamp for a start time for the command or application running within the respective window.

2. The method of claim 1, further comprising:

sorting the candidate windows according to a user-specified sort order.

3. The method of claim 2, wherein the step of sorting the candidate windows according to a user-specified sort order further comprises:

sorting the candidate windows alphabetically by a name of a command or application running within each candidate window, or sorting the candidate windows alphabetically by a filename or uniform resource locator parameter for the command or application running within each candidate window, or sorting the candidate windows alphabetically by a name of a working directory for the command or application running within each candidate window, or sorting the candidate windows by a timestamp for a start time of the command or application running within each candidate window.

4. The method of claim 1, wherein the step of displaying all candidate windows corresponding to entries within the list which match the specified search criteria further comprises:

displaying the candidate windows according to a user-specified display format.

5. The method of claim 4, wherein the step of displaying the candidate windows according to a user-specified display format further comprises:

displaying the candidate windows in a cascaded configuration, or displaying the candidate windows in a tiled configuration, or displaying the candidate windows in a cascaded configuration with a front window for the cascaded configuration cycling among the candidate windows at a predetermined interval, or displaying the candidate windows in a full screen configuration with a current window cycling among the candidate windows at a predetermined interval.

6. The method of claim 1, wherein the step of providing a list of each open window, wherein each entry within the list containing a plurality of searchable parameters relating to a respective window and an application running within the respective window further comprises:

updating the list whenever a window is opened, a window is closed, a new command or application is started within an open window, a new filename or uniform resource locator parameter is specified for the command or application running within an open window, or a new working directory is specified for a command or application running within an open window.

7. A system for locating a window, comprising:

a list of each open window, wherein each entry within the list containing a plurality of searchable parameters relating to a respective window and an application running within the respective window;

a window locator, responsive to receiving a locate request containing user specified search criteria, traversing the list and comparing each entry within the list to the search criteria to determine whether any entries within the list match the specified search criteria; and a display displaying all candidate windows corresponding to entries within the list which match the specified search criteria; wherein each entry within the list further comprises:

a name for a command or application running within a respective window, a filename or uniform resource locator parameter for the command or application running within the respective window, a working directory for the command or application running within the respective window, and a timestamp for a start time for the command or application running within the respective window.

8. The system of claim 8, further comprising:

a sort mechanism sorting the candidate windows according to a user-specified sort order.

9. The system of claim 8, wherein the sort mechanism sorts the candidate windows:

alphabetically by a name of a command or application running within each candidate window, or alphabetically by a filename or uniform resource locator parameter for the command or application running within each candidate window, or alphabetically by a name of a working directory for the command or application running within each candidate window, or by a timestamp for a start time of the command or application running within each candidate window.

10. The system of claim 7, wherein the display displays the candidate windows according to a user-specified display format.

11. The system of claim 10 wherein the display displays the candidate windows:

in a cascaded configuration, or in a tiled configuration, or in a cascaded configuration with a front window for the cascaded configuration cycling among the candidate windows at a predetermined interval, or in a full screen configuration with a current window cycling among the candidate windows at a predetermined interval.

12. The system of claim 7, wherein the list of each open window is updated whenever a window is opened, a window is closed, a new command or application is started within an open window, a new filename or uniform resource locator parameter is specified for the command or application running within an open window, or a new working directory is specified for a command or application running within an open window.

13. A computer program product within a computer usable medium for locating a window, comprising:

instructions for providing a list of each open window, wherein each entry within the list containing a plurality of searchable parameters relating to a respective window and an application running within the respective window;

instructions, responsive to receiving a locate request containing user specified search criteria, for traversing the list and comparing each entry within the list to the search criteria to determine whether any entries within the list match the specified search criteria;

instructions for displaying all candidate windows corresponding to entries within the list which match the specified search criteria; and instructions for recording, within each entry for the list, a name for a command or application running within a respective window, a filename or uniform resource locator parameter for the command or application running within the respective window, a working directory for the command or application running within the respective window, and a timestamp for a start time for the command or application running within the respective window.

14. The computer program product of claim 13 further comprising:

instructions for sorting the candidate windows according to a user-specified sort order.

15. The computer program product of claim 14, wherein the instructions for sorting the candidate windows according to a user-specified sort order further comprise:

instructions for sorting the candidate windows:

alphabetically by a name of a command or application running within each candidate window, or alphabetically by a filename or uniform resource locator parameter for the command or application running within each candidate window, or alphabetically by a name of a working directory for the command or application running within each candidate window, or by a timestamp for a start time of the command or application running within each candidate window.

16. The computer program product of claim 13, wherein the instructions for displaying all candidate windows corresponding to entries within the list which match the specified search criteria further comprise:

instructions for displaying the candidate windows according to a user-specified display format.

17. The computer program product of claim 16, wherein the instructions for displaying the candidate windows according to a user-specified display format further comprise:

instructions for displaying the candidate windows:
in a cascaded configuration, or
in a tiled configuration, or
in a cascaded configuration with a front window for the cascaded configuration cycling among the candidate windows at a predetermined interval, or
in a full screen configuration with a current window cycling among the candidate windows at a predetermined interval.

18. The computer program product of claim 13, wherein the instructions for providing a list of each open window, wherein each entry within the list containing a plurality of searchable parameters relating to a respective window and an application running within the respective window further comprise:

instructions for updating the list whenever a window is opened, a window is closed, a new command or application is started within an open window, a new filename or uniform resource locator parameter is specified for the command or application running within an open window, or a new working directory is specified for a command or application running within an open window.

* * * * *

UNITED STATES PATENT AND TRADEMARK OFFICE
CERTIFICATE OF CORRECTION

PATENT NO.    : 6,462,757 B1
DATED         : October 8, 2002
INVENTOR(S)   : Kao et al.

It is certified that error appears in the above-identified patent and that said Letters Patent is hereby corrected as shown below:

<u>Title page,</u>
Item [57], ABSTRACT,
Line 12, after "application; and the times tamp-for" should be replaced with
-- application; and the timestamp for --
Line 15, after "parameters, or times tamp of" should be replaced with
-- parameters, or timestamp of --.

Signed and Sealed this

Twenty-ninth Day of July, 2003

JAMES E. ROGAN
*Director of the United States Patent and Trademark Office*